US012671308B2

(12) United States Patent
Rossi et al.

(10) Patent No.: US 12,671,308 B2
(45) Date of Patent: Jun. 30, 2026

(54) DRIVER FOR SLEW-RATE CONTROL OF PHASE NODE IN BUCK CONVERTER

(71) Applicant: STMicroelectronics International N.V., Geneva (CH)

(72) Inventors: Sandro Rossi, Pavia (IT); Niccolò Brambilla, San Donato Milanese (IT); Francesco Franco, Milan (IT)

(73) Assignee: STMicroelectronics International N.V., Geneva (CH)

( * ) Notice: Subject to any disclaimer, the term of this patent is extended or adjusted under 35 U.S.C. 154(b) by 315 days.

(21) Appl. No.: 18/463,753

(22) Filed: Sep. 8, 2023

(65) Prior Publication Data

US 2025/0088104 A1    Mar. 13, 2025

(51) Int. Cl.
H02M 1/00        (2007.01)
H02M 1/08        (2006.01)
H02M 3/158       (2006.01)

(52) U.S. Cl.
CPC ........... H02M 1/0029 (2021.05); H02M 1/08 (2013.01); H02M 3/1588 (2013.01)

(58) Field of Classification Search
CPC ......... H02M 1/0029; H02M 1/08–088; H02M 3/155–1588
See application file for complete search history.

(56) References Cited

U.S. PATENT DOCUMENTS

| | | | | |
|---|---|---|---|---|
| 7,511,390 | B1 * | 3/2009 | Walter .................. | H02M 3/158 |
| | | | | 307/115 |
| 10,715,147 | B1 | 7/2020 | Tejada et al. | |
| 2011/0018593 | A1 | 1/2011 | Williams | |
| 2021/0184576 | A1 | 6/2021 | Cattani et al. | |
| 2021/0359674 | A1 * | 11/2021 | Keskar ............ | H03K 17/04206 |
| 2022/0208755 | A1 * | 6/2022 | Tipirneni ............... | H10D 1/692 |
| 2022/0209654 | A1 * | 6/2022 | Jodka ....................... | H02M 1/08 |
| 2024/0106424 | A1 * | 3/2024 | Nishimura ............... | H03K 5/04 |
| 2024/0113611 | A1 * | 4/2024 | Kaufmann .......... | H02M 1/0029 |
| 2024/0146177 | A1 * | 5/2024 | Mehdi ..................... | H02M 1/44 |
| 2025/0070635 | A1 * | 2/2025 | Blecic ................. | H02M 1/0025 |

FOREIGN PATENT DOCUMENTS

| | | |
|---|---|---|
| WO | 2016012553 A1 | 1/2016 |
| WO | 2018191154 A1 | 10/2018 |

* cited by examiner

*Primary Examiner* — Fred E Finch, III
(74) *Attorney, Agent, or Firm* — Slater Matsil, LLP

(57)        ABSTRACT

A Buck converter includes: a first power switch coupled between a supply voltage node and a switching node, where the first power switch is configure to be controlled by a first control signal; a boot-strap capacitor, where a first terminal of the boot-strap capacitor is coupled to the switching node; a first buffer coupled between a first node and a control terminal of the first power switch; a first switch circuit coupled between the first node and a second terminal of the boot-strap capacitor, where the first switch circuit is controlled by the first control signal, and is configured to pass through a first charging current provided by the boot-strap capacitor when the first control signal is asserted; and a slew-rate control capacitor, where a first terminal of the slew-rate control capacitor is coupled to the first node.

17 Claims, 8 Drawing Sheets

135

145

DRIVER FOR SLEW-RATE CONTROL OF PHASE NODE IN BUCK CONVERTER

TECHNICAL FIELD

The present invention relates generally to switched-mode power supply (SMPS), and in particular embodiments, to Buck converters with driver circuits for slew-rate control of the phase node.

BACKGROUND

Power converters are pervasive in many electronic applications from computers to automobiles. In some embodiments, voltages within a power converter are generated by performing a DC-DC, DC-AC, and/or AC-DC conversion by operating a switch loaded with an inductor or transformer. Examples of power converters include switched mode power supplies (SMPS) and linear regulators. An SMPS is usually more efficient than other types of power conversion systems because power conversion is performed by controlled charging and discharging of the inductor or transformer and reduces energy lost due to power dissipation across resistive voltage drops.

An SMPS usually includes at least one switch (also referred to as a power switch) and an inductor or transformer. Some specific topologies include Buck converters, boost converters, and flyback converters, among others. A control circuit is commonly used to open and close the switches to charge and discharge the inductor. In some applications, the current supplied to the load and/or the voltage supplied to the load is controlled via a feedback loop. In some typologies, the switches used in the SMPS are implemented using cascode switches. Linear regulator is another class of power converter where a pass transistor is controlled (e.g., turned on and off) by a controller to provide a steady voltage to an external load.

Buck converter is a popular choice of SMPS and is often used to provide power for a downstream device such as a sensor or a processor. Slew-rate control of the phase node (also referred to as the switching node) of the Buck converter has direct impact on the performance of the Buck converter. There is a need in the art for a Buck converter with good slew-rate control mechanism.

SUMMARY

In accordance with an embodiment, a switched-mode power supply (SMPS) includes: a high-side switch coupled between a supply voltage node and a switching node, wherein the high-side switch is configured to be controlled by a first control signal; a low-side switch coupled between the switching node and a reference voltage node, wherein the low-side switch is configured to be controlled by a second control signal; and a driver circuit for the high-side switch and the low-side switch. The driver circuit includes: a first buffer circuit coupled between a first node and a control terminal of the high-side switch; a first switch circuit, wherein a control terminal of the first switch circuit is configured to receive the first control signal, an input terminal of the first switch circuit is coupled to a first power source, and an output terminal of the first switch circuit is coupled to the first node, wherein the first switch circuit is configured to output a first charging current provided by the first power source when the first control signal is asserted; a second buffer circuit coupled between a second node and a control terminal of the low-side switch; a second switch circuit, wherein a control terminal of the second switch circuit is configured to receive the second control signal, an input terminal of the second switch circuit is coupled to a second power source, and an output terminal of the second switch circuit is coupled to the second node, wherein the second switch circuit is configured to output a second charging current provided by the second power source when the second control signal is asserted; and a first slew-rate control capacitor, wherein a first terminal of the first slew-rate control capacitor is coupled to the first node.

In accordance with an embodiment, a Buck converter includes: a high-side switch and a low-side switch coupled in series between a supply voltage node and a reference voltage node, wherein the high-side switch and the low-side switch are configured to be controlled by a first control signal and a second control signal, respectively; a switching node between the high-side switch and the low-side switch; a first buffer coupled between a first node and a control terminal of the high-side switch; a first switch circuit, wherein a control terminal of the first switch circuit is configured to receive the first control signal, wherein when the first control signal is asserted, the first switch circuit is configured to pass through a first charging current provided by a first power source to the first node; a second buffer coupled between a second node and a control terminal of the low-side switch; a second switch circuit, wherein a control terminal of the second switch circuit is configured to receive the second control signal, wherein when the second control signal is asserted, the second switch circuit is configured to pass through a second charging current provided by a second power source to the second node; and a first slew-rate control capacitor, wherein a first terminal of the first slew-rate control capacitor is coupled to the first node.

In accordance with an embodiment, a Buck converter includes: a first power switch coupled between a supply voltage node and a switching node, wherein the first power switch is configure to be controlled by a first control signal; a boot-strap capacitor, wherein a first terminal of the boot-strap capacitor is coupled to the switching node; a first buffer coupled between a first node and a control terminal of the first power switch; a first switch circuit coupled between the first node and a second terminal of the boot-strap capacitor, wherein the first switch circuit is controlled by the first control signal, and is configured to pass through a first charging current provided by the boot-strap capacitor when the first control signal is asserted; and a slew-rate control capacitor, wherein a first terminal of the slew-rate control capacitor is coupled to the first node.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EXAMPLES

Figure 1:
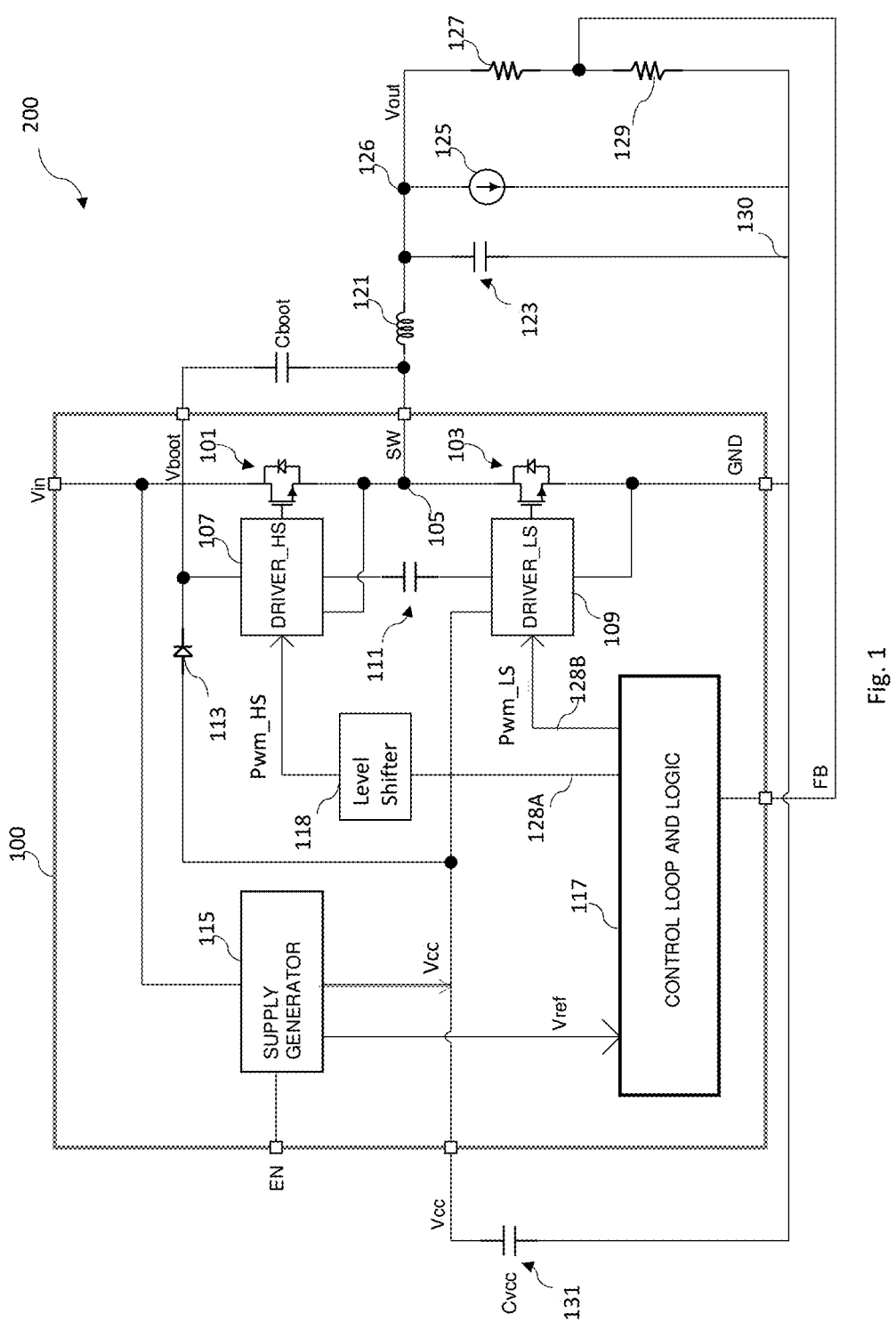
FIG. 1 illustrates a block diagram of a switched-mode power supply (SMPS), in an embodiment.

The making and using of the presently disclosed examples are discussed in detail below. It should be appreciated, however, that the present invention provides many applicable inventive concepts that can be embodied in a wide variety of specific contexts. The specific examples discussed are merely illustrative of specific ways to make and use the invention, and do not limit the scope of the invention. Throughout the discussion herein, unless otherwise specified, the same or similar reference numerals or labels in different figures refer to the same or similar component (or signal).

The present disclosure will be described with respect to examples in a specific context, namely Buck converter with a driver circuit that is capable of achieving slew-rate control for the switching node (also referred to as phase node) of the Buck converter.

FIG. 1 illustrates a block diagram of a switched-mode power supply (SMPS) 200, in an embodiment. Note that for simplicity, not all features of the SMPS 200 are illustrated.

The SMPS 200 in FIG. 1 is a Buck converter. In the example of FIG. 1, some of the components of the Buck converter are integrated together on a same semiconductor substrate (e.g., silicon) to form an integrated circuit (IC) device 100 or a portion of an IC device 100. An example of the IC device 100 is a power-management integrated circuit (PMIC) device. Components of the SMPS 200 outside (e.g., not integrated into) the IC device 100 are referred to as external components connected to the IC device 100. The pins of the IC device 100 are illustrated in FIG. 1 as rectangular shaped connectors. The number and the type of components of the Buck converter integrated into the IC device 100 shown in FIG. 1 are merely non-limiting examples. Depending on how the SMPS 200 is partitioned, the IC device 100 may integrated other numbers or other types of components of the Buck converter.

In FIG. 1, the SMPS 200 (e.g., a Buck converter) includes a switch 101 (also referred to as a high-side switch), a switch 103 (also referred to as a low-side switch), a high-side gate driver circuit 107 for the high-side switch 101, a low-side gate driver circuit 109 for the low-side switch 103, and a slew-rate control capacitor 11 coupled between the high-side gate driver circuit 107 and the low-side gate driver circuit 109. The high-side gate driver circuit 107, the low-side gate driver circuit 109, the slew-rate control capacitor in may be collectively referred to as the driver circuit (or gate driver circuit) of the Buck converter. Note that one slew-rate control capacitor (e.g., 111) is shown in FIG. 1 as being coupled between the high-side gate driver circuit 107 and the low-side gate driver circuit 109. This is, of course, merely a non-limiting example. The driver circuit of the Buck converter may have more than one slew-rate control capacitors, and the slew-rate capacitors may be connected in different configurations. Various embodiments of the driver circuits (e.g., 150A, 150B, 150C, and 150D) of the Buck converter are discussed hereinafter.

In the example of FIG. 1, the switches 101 and 103 are N-type transistors. The switches 101 and 103 may also be referred to as transistors 101 and 103 in the discussion here. In other embodiments, the switch 101 is a P-type transistor, and the switch 103 is an N-type transistor. These and other variations are fully intended to be included within the scope of the present disclosure. A switching node 105 (also referred to as the phase node) between the switch 101 and the switch 103 is connected to a pin SW of the IC device 100.

The SMPS 200 in FIG. 1 further includes a control loop and logic circuit 117 for generating the switching control signals 128 (e.g., 128A and 128B). In some embodiments, the switching control signals 128A and 128B are pulse-width modulated (PWM) signals used for controlling the switching of the high-side switch 101 and the low-side switch 103, respectively. In some embodiments, the switching control signals 128A and 128B are low voltage digital signals that may toggle between, e.g., zero volt and +5 V. In the illustrated embodiment, the control signal 128B is sent to the control terminal (e.g., gate terminal) of the low-side switch 103, and may be referred to as the control signal Pwm_LS. The voltage of the control signal 128A is shifted by a level-shifter 118 to generate the control signal Pwm_HS sent to the control terminal of the high-side switch 101. Denote the voltage of the control signal 128A as $V_{128A}$, and denote the voltage at the switch node 105 as voltage $V_{SW}$, the output of the level shifter is $V_{SW}+V_{128A}$. Note that the voltage $V_{SW}$ at the switching node 105 changes during operation of the Buck converter, and as a result, the voltage of the control signal Pwm_LS shifts with the voltage $V_{SW}$. For example, when the control signal 128A rises from zero volt to $V_{cc}$ (e.g., +5 V) to turn on the high-side switch 101, the level shifter 118 translates (e.g., shifts) this value (e.g., +5 V) to match the $V_{boot}$ value ($V_{SW}+5$ V=5 V, $V_{SW}$ is zero volt at this time since the low-side switch 103 is just turned off). Then the high-side switch 101 is turned on and the voltage $V_{SW}$ rises. At the end of the transition, the voltage $V_{SW}$ reaches the supply voltage $V_{in}$ ($V_{SW}=V_{in}$), therefore the voltage of the control signal Pwm_HS is $V_{in}+5$ V (e.g., +105 V) at the end of the transition. Note that the above example assumes that a logic HIGH value for the control signal 128A turns on the high-side switch 101, which is a non-limiting example. The logic values for the control signals 128 (e.g., 128A, 128B) to turn on the power switches (e.g., 101, 103) are determined by the structure of the driver circuits for the power switches and the type (e.g., N-type, or P-type) of the power switches, as skilled artisans readily appreciate. In subsequent examples discussed herein, logic LOW values for the control signals 128 may be used to turn on the power switches.

The control loop and logic circuit 117 may compare a feedback voltage received at a pin FB of the IC device 100 with a reference voltage $V_{ref}$, and based on the values of the feedback voltage and the reference voltage $V_{ref}$ generates the switching control signals 128. Circuits for generating the switching control signals 128 are known and used in the art. For example, U.S. patent application Ser. No. 18/334,708 and U.S. patent application Ser. No. 18/334,757 disclose various control circuits that generate switching control signals for the high-side switch and the low-side switch, and achieve stability control of the Buck converter. U.S. patent application Ser. No. 18/334,708 and U.S. patent application Ser. No. 18/334,757 are incorporated herein by reference.

In the example of FIG. 1, the SMPS 200 includes a supply generator 115 that generates one or more supply voltages (e.g., $V_{cc}$) from a supply voltage applied at a pin $V_{in}$ of the IC device 100. For ease of discussion, the supply voltage applied at the pin $V_{in}$ of the IC device 100 may also be referred to as the voltage $V_{in}$. The one or more supply voltages (e.g., $V_{cc}$) generated by the supply generator 115 may be referred to internal supply voltages, and may have lower voltages than the voltage $V_{in}$.

In some embodiments, the voltage $V_{in}$ has a value between, e.g., +10 V and about +100 V. The supply generator 115 includes a linear regulator, such as a low-drop out (LDO) regulator, that generates a supply voltage $V_{cc}$ (e.g., a +5V supply voltage), which is used to, e.g., power the low-side gate driver circuit 109 and to charge a boot-strap capacitor $C_{boot}$. In FIG. 1, the supply voltage $V_{cc}$ is connected to a pin $V_{cc}$ of the IC device 100, and is filtered using a capacitor 131 connected to the pin $V_{cc}$ of the IC device 100. The capacitor 131 is omitted in some embodiments. In some embodiments, the supply generator 115 also includes one or more reference circuitries, such as a bandgap reference voltage circuit, to generate the reference voltage $V_{ref}$, which is used by the control loop and logic circuit 117 for comparing with the feedback voltage at the pin FB. The reference circuitries may also generate the charging currents discussed below for slew-rate control of the phase node. In some embodiments, the supply generator 115 is omitted in the IC device 100, and the various internal supply voltages (e.g., $V_{cc}$ and $V_{ref}$) are provided through pins of the IC device 100 by an external voltage source(s) located outside the IC device 100.

In the example of FIG. 1, an enable signal is received at a pin EN of the IC device 100 and sent to the supply generator 115. The enable signal may be used to enable the IC device 100 (e.g., to startup the IC device 100 and to allow the supply generator 115 to generate the internal supply voltages), or to disable the IC device 100 (e.g., to suspend operation of the IC device 100).

As illustrated in FIG. 1, the switch 101 is coupled between the pin $V_{IN}$ of the IC device 100 and the pin SW of the IC device 100, and the switch 103 is coupled between the pin SW and a pin GND of the IC device 100. The pin $V_{IN}$ is configured to receive a supply voltage (e.g., the voltage $V_{IN}$ which is between +10 V and +100 V), and the pin GND is configured to be connected to a reference voltage (e.g., electrical ground). An inductor 121 is coupled between the pin SW and a node 126 (may also be referred to as an output terminal of the SMPS 200), and a capacitor 123 is coupled between the node 126 and a reference node 130. The reference node 130 is configured to be connected to a reference voltage (e.g., electrical ground). During operation of the Buck converter, the voltage at the node 126 is the output voltage $V_{OUT}$ of the Buck converter.

In embodiments where the Buck converter works in a continuous conduction mode, and the switches 101 and 103 are the same type (e.g., N-type) of transistors, the control loop and logic circuit 117 generates the switching control signals 128A and 128B with opposite values (e.g., logic HIGH or logic LOW), thereby setting the switches 101 and 103 in opposite states (e.g., ON state or OFF state) during operation of the Buck converter. In other words, for the above example of continuous conduction mode, during operation of the Buck converter, the switch 101 is closed when the switch 103 is open, and the switch 101 is open when the switch 103 is closed.

The Buck converter of FIG. 1 further includes a boot-strap capacitor $C_{boot}$. The boot-strap capacitor $C_{boot}$ is coupled between a pin $V_{boot}$ of the IC device 100 and the pin SW. In the example of FIG. 1, a diode 113 is coupled between the pin $V_{CC}$ and the pin $V_{boot}$, which allows the boot-strap capacitor $C_{boot}$ to be charged by the supply voltage $V_{CC}$ when the voltage at the switching node 105 is below the supply voltage $V_{CC}$.

During operation of the Buck converter, when the switch 101 (e.g., an N-type transistor) needs to be closed (e.g., needs to be turned on), the voltage across the boot-strap capacitor $C_{boot}$ (provided by the charge stored in the boot-strap capacitor $C_{boot}$) provides a gate-source voltage of, e.g., +5V, for the transistor 101 to turn on the transistor 101. When the voltage at the pin SW is low (e.g., the corresponding voltage at the pin $V_{boot}$ is equal to or lower than the supply voltage $V_{CC}$) after the switch 101 is open (e.g., turned off), the supply voltage $V_{CC}$ charges the boot-strap capacitor $C_{boot}$ (e.g., to restore the +5V voltage across the boot-strap capacitor $C_{boot}$). The capacitance of the boot-strap capacitor $C_{boot}$ may be large, thus an external capacitor is used as the boot-strap capacitor $C_{boot}$, and the pin $V_{boot}$ is used to provide an electrical connection between the boot-strap capacitor $C_{boot}$ and the switch 101.

Still referring to FIG. 1, the output voltage $V_{OUT}$ of the Buck converter is sent to a voltage divider formed by resistors 127 and 129, which are coupled between the node 126 and the reference voltage node 130. The output of the voltage divider, referred to as a feedback voltage, is sent to the pin FB of the IC device 11o. In the example of FIG. 1, a load 125, which is illustrated as a current source as a non-limiting example, is coupled between the node 126 and the reference voltage node 130.

The structure of the Buck converter illustrated in FIG. 1 is merely a non-limiting example. Variations are possible and are fully intended to be included within the scope of the present disclosure. For example, the switch 103 in FIG. 1 may be replaced by a diode with its cathode connected to the pin SW and its anode connected to the pin GND. As another example, the diode 113 may be replaced by a switch (e.g., a transistor), which switch is turned off when the boot-strap capacitor $C_{boot}$ provides the gate-source voltage to turn on the switch 101, and is turned on to allow charging of the boot-strap capacitor $C_{boot}$ when the voltage at the pin SW is low (e.g., the corresponding voltage at the pin $V_{boot}$ is equal to or lower than the supply voltage $V_{CC}$) after the switch 101 is open.

Slew-rate control of the phase node of a buck converter refers to the control of the slew-rate of the voltage at the phase node 105. For ease of discussion, the voltage at the phase node 105 is also referred to as phase node voltage $V_{SW}$, or switching node voltage $V_{SW}$. Slew-rate of the phase node voltage $V_{SW}$ may refer to the slew-rate of the rising edge of the phase node voltage $V_{SW}$, and/or the slew-rate of the falling edge of the phase node voltage $V_{SW}$. Skilled artisans will readily appreciate that the slew-rate of the phase node voltage $V_{SW}$ affects the switching duration of the Buck converter, and therefore, affects the switching loss of the Buck converter. For example, the switching loss of a Buck converter may be inversely proportional to the slew rate of the phase node voltage $V_{SW}$. It is therefore advantageous to be able to control the slew-rate of the phase node in order to control the switching loss of the Buck converter.

Slew-rate control may be advantageous for other aspects of the performance of the Buck converter. For example, for devices with specific Electromagnetic Interference (EMI) requirement, slew-rate control may be used to control the amount of EMI generated by the switching of the switches 101 and 103 in the Buck converter. In addition, slew-rate control may be needed for Buck converters with a strong capacitance non-linearity of the power switches (e.g., 101 and 103). In addition, it may be useful to control the slew-rate (e.g., slow it down) in order to avoid dynamic breakdown of the low-side switch intrinsic diode after dead time. Various embodiments of Buck converter are disclosed hereinafter, where the driver circuit of each embodiment Buck converter uses one or more slew-rate control capacitors to control the slew-rate of the phase node voltage.

Figure 2:
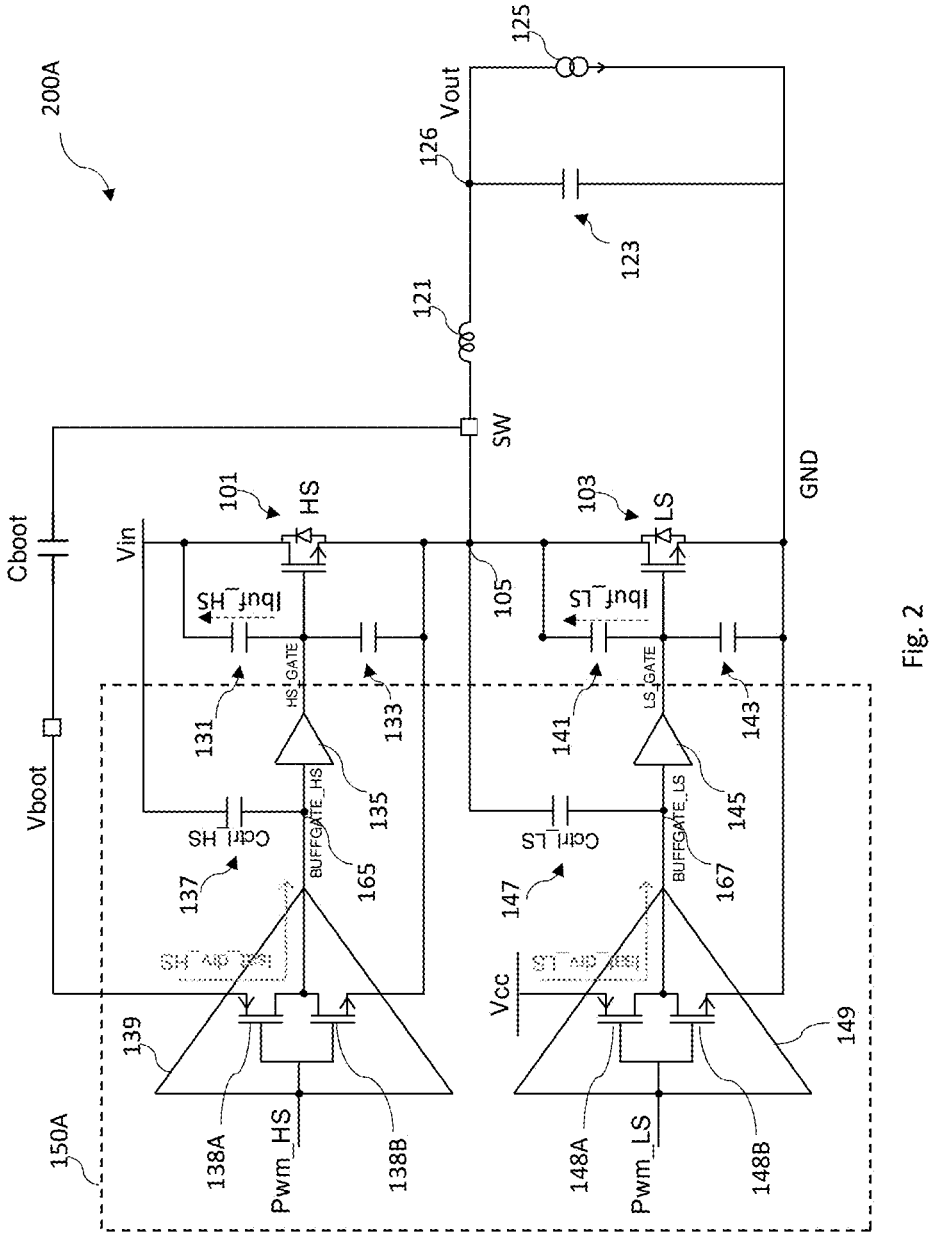
FIG. 2 illustrates a schematic diagram of an SMPS having a driver circuit capable of slew-rate control for the switching node, in an embodiment.

FIG. 2 illustrates a schematic diagram of a SMPS 200A, in an embodiment. The SMPS 200A is an example implementation of the generic SMPS 200 shown in FIG. 1. In particular, the SMPS 200A has a driver circuit 150A capable of slew-rate control for the phase node 105. Details of the driver circuit 150A are discussed hereinafter. Note that for simplicity, some components in FIG. 1, such as the control loop and logic circuit 117, the supply generator 115, the diode 113, the resistors 127/129, and the capacitor 131, are not shown in FIG. 2, within the understanding that these components are included in the SMPS 200A with the same or similar electrical connections as shown in FIG. 1.

FIG. 2 illustrates a capacitor 131 coupled between the gate terminal and the drain terminal of the transistor 101, and a capacitor 133 coupled between the gate terminal and the source terminal of the transistor 101. The capacitors 131 and 133 represent the gate-drain capacitance and the gate-source capacitance of the transistor 101, and therefore, are not external capacitors connected to the transistor 101, as skilled artisans readily appreciate. Similarly, capacitors 141 and 143 represent the gate-drain capacitance and the gate-source capacitance of the transistor 103. FIG. 2 also shows the body diodes of the transistor 101 and 103, which are not external diodes connected to the transistors 101 and 103, as skilled artisans readily appreciate.

In FIG. 2, the driver circuit 150A includes a buffer circuit 135 (also referred to as a buffer) coupled between a node 165 (also referred to as a control node BUFFGATE_HS) and the control terminal (e.g., gate terminal) of the switch 101, a slew-rate control capacitor 137 coupled between the node 165 and a supply voltage node connected to the supply voltage $V_n$, and a switch circuit 139. In the example of FIG. 2, the switch circuit 139 is implemented as an inverter that includes a transistor 138A (e.g., a P-type transistor) and a transistor 138B (e.g., an N-type transistor) coupled in series between the pin $V_{boot}$ and the switching node 105. A control terminal of the switching circuit 139 is configured to receive the control signal Pwm_HS, and an output terminal of the switch circuit 139 is coupled to the node 165.

The driver circuit 150A in FIG. 2 further includes a buffer circuit 145 (also referred to as a buffer) coupled between a node 167 (also referred to as a control node BUFFGATE_LS) and the control terminal (e.g., gate terminal) of the switch 103, a slew-rate control capacitor 147 coupled between the node 167 and the switching node 105, and a switch circuit 149. In the example of FIG. 2, the switch circuit 149 is implemented as an inverter that includes a transistor 148A (e.g., a P-type transistor) and a transistor 148B (e.g., an N-type transistor) coupled in series between the pin $V_{cc}$ and the pin GND. A control terminal of the switching circuit 149 is configured to receive the control signal Pwm_LS, and an output terminal of the switch circuit 149 is coupled to the node 167.

In some embodiments, during operation of the Buck converter, when the switch 101 needs to be turned on, the control signal Pwm_HS is asserted (e.g., having a value corresponding to logic LOW), and the control signal Pwm_LS is de-asserted (e.g., having a value corresponding to logic HIGH). Note that in the discussion herein, when the control signal Pwm_HS (or Pwm_LS) is asserted, the corresponding switch 101 (or 103) is turned on; and when the control signal control signal Pwm_HS (or Pwm_LS) is de-asserted, the corresponding switch 101 (or 103) is turned off. The logic value (e.g., logic LOW or logic HIGH) associated with the assertion or de-assertion of the control signal depends on the specific implementation of the switch circuit 139 (or 149). Therefore, the logic values given above to assert or de-assert the control signals Pwm_HS and Pwm_LS are simply non-limiting examples.

When the control signal Pwm_HS is asserted, the transistor 138A in the switch circuit 139 is turned on, and the transistor 138B is turned off, this allows a charging current $I_{sat\_drv\_HS}$ provided by the boot-strap capacitor $C_{boot}$ to be outputted at the output terminal of the switch circuit 139. The charging current $I_{sat\_drv\_HS}$ charges the slew-rate control capacitor 137 and causes the voltage across the slew-rate control capacitor 137 to change. The buffer circuit 135 coupled between the node 165 and the switch 101 provides a corresponding charging current $I_{buf\_HS}$ for the gate-drain capacitance of the switch 101 to control the slew-rate of the phase node 105 in accordance with the variation of the voltage across the slew-rate control capacitor 137. In some embodiments, the slew-rate of the rising edge of the phase node voltage $V_{SW}$, denoted as $Sw_{SRUP}$, is given by:

$$Sw_{SRUP} = \frac{I_{sat\_drv\_HS}}{C_{ctrl\_HS}} = \frac{I_{buf\_HS}}{C_{gd\_HS}} \tag{1}$$

where $C_{ctrl\_HS}$ is the capacitance of the slew-rate control capacitor 137, and $C_{gd\_HS}$ is the gate-drain capacitance of the switch 101. Embodiments of the buffer circuits 135 and 145 are discussed hereinafter with reference to FIGS. 3A and 3B.

As shown in Equation (1), given the capacitance $C_{ctrl\_HS}$ of the slew-rate control capacitor 137, the slew-rate of the rising edge of the phase node voltage $V_{SW}$ can be adjusted by adjusting the charging current $I_{sat\_drv\_HS}$. Note that in the illustrated embodiment, the charging current $I_{sat\_drv\_HS}$ is provided by the boot-strap capacitor $C_{boot}$. To adjust the charging current $I_{sat\_drv\_HS}$ provided by the boot-strap capacitor $C_{boot}$, the size (e.g., physical dimensions such as the channel length, channel width, and/or overall dimension of the transistor) of the transistor 138A may be adjusted to achieve different values for the charging current $I_{sat\_drv\_HS}$, as an example.

In some embodiments, during operation of the Buck converter, when the switch 103 needs to be turned on, the control signal Pwm_HS is de-asserted (e.g., having a value corresponding to logic HIGH), and the control signal Pwm_LS is asserted (e.g., having a value corresponding to logic LOW). As a result, the transistor 148A in the switch circuit 149 is turned on, and the transistor 148B is turned off, this allows a charging current $I_{sat\_drv\_LS}$ provided by the supply generator 115 (see FIG. 1) to be outputted at the output terminal of the switch circuit 149. The charging current $I_{sat\_drv\_LS}$ is the current of the supply voltage $V_{cc}$ provided by the supply generator 115, in the illustrated embodiments.

The charging current $I_{sat\_drv\_LS}$ charges the slew-rate control capacitor 147 and causes the voltage across the slew-rate control capacitor 147 to change. The buffer circuit 145 coupled between the node 167 and the switch 103 provides a corresponding charging current $I_{buf\_LS}$ for the gate-drain capacitance of the switch 103 to control the slew-rate of the phase node 105 in accordance with the variation of the voltage across the slew-rate control capacitor 147. In some embodiments, the slew-rate of the falling edge of the phase node voltage $V_{SW}$, denoted as $Sw_{SRDOWN}$, is given by:

$$Sw_{SRDOWN} = \frac{I_{sat\_drv\_LS}}{C_{ctrl\_LS}} = \frac{I_{buf\_LS}}{C_{gd\_LS}} \qquad (2)$$

where $C_{ctrl\_LS}$ is the capacitance of the slew-rate control capacitor 147, and $C_{gd\_LS}$ is the gate-drain capacitance of the switch 103. As shown in Equation (2), given the capacitance $C_{ctrl\_LS}$ of the slew-rate control capacitor 147, the slew-rate of the falling edge of the phase node voltage $V_{SW}$ can be adjusted by adjusting the charging current $I_{sat\_drv\_LS}$. In some embodiments, the supply generator 115 is designed to provide the supply voltage $V_{cc}$ with the desired value for the charging current $I_{sat\_drv\_LS}$.

In some embodiments, the gate-drain capacitances of the switches 101 and 103 may exhibit non-linear behavior, and may cause non-linearity in the slew-rates of the phase node voltage. To overcome the non-linearity of the gate-drain capacitances, for embodiments where the buffer circuits 135 and 145 are omitted, the capacitances of the slew-rate control capacitors 137 and 147 (which are designed to have fixed capacitances) are chosen to be much larger than the gate-drain capacitances of the switches 101 and 103. For example, the gate-drain capacitance of the switches 101 and 103 may be around 10 pF, and the slew-rate control capacitors 137 and 147 may have capacitances that are between 2 times and 10 times of the gate-drain capacitances to dominate over the gate-drain capacitances. In some embodiments, the slew-rate control capacitors 137 and 147 are implemented as metal capacitors in the IC device 100. Metal capacitors may have poor integration density, and may require large area (e.g., large silicon area) in the IC device 100. However, the buffer circuits 135 and 145 decouple the slew-rate control nodes (e.g., 165 and 167) from the gates of the transistors 101/103, which greatly reduces the capacitances needed for the slew-rate control capacitors 137 and 147, thus advantageously reducing the area needed in the IC device 100 for implementation. For example, the presence of the buffer circuits 135 and 145 allows the slew-rate control capacitors 137 and 147 with capacitance between about 100 fF and 400 fF to be used.

Figure 5:
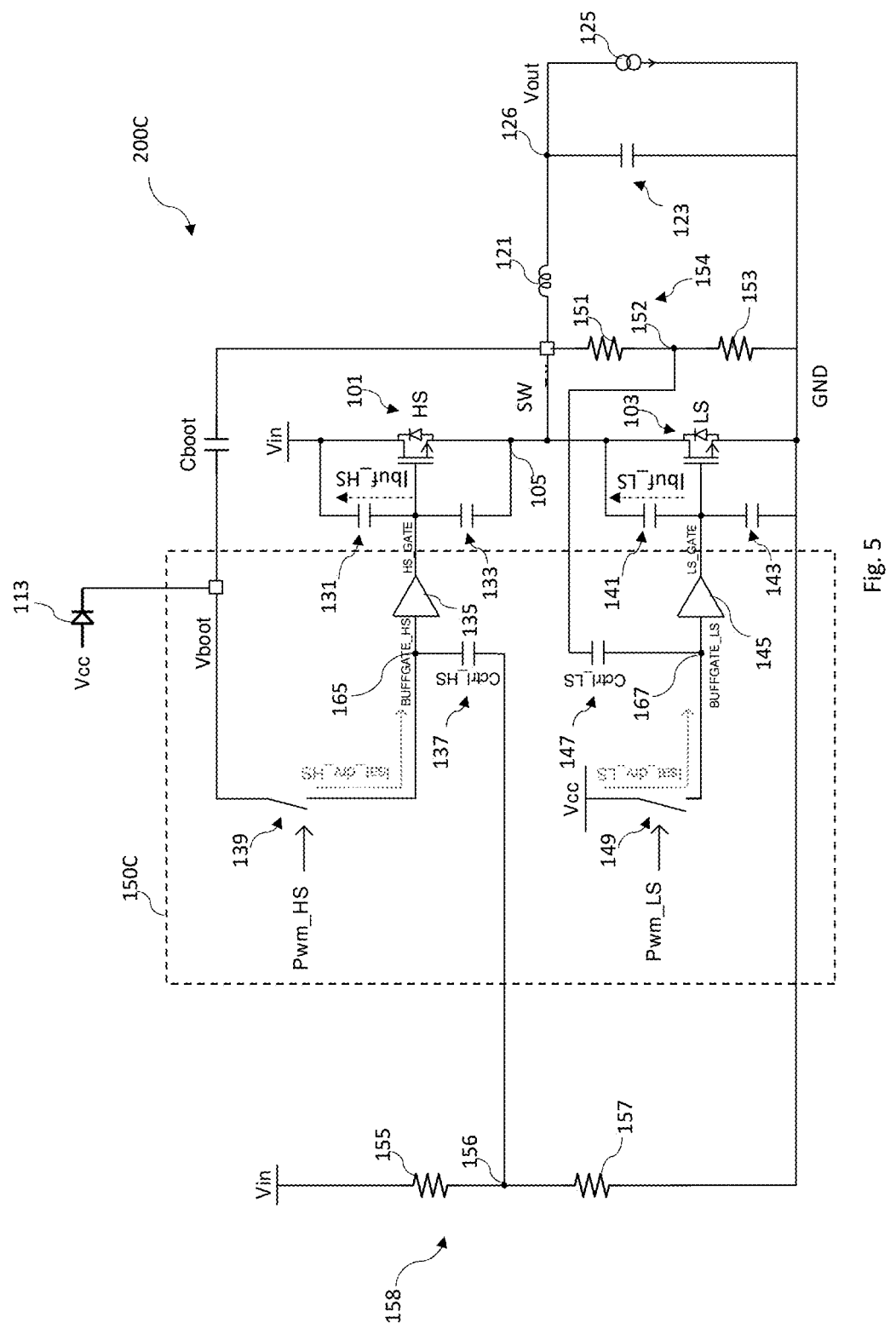
FIG. 5 illustrates a schematic diagram of an SMPS having a driver circuit capable of slew-rate control for the switching node, in another embodiment.
Figure 6:
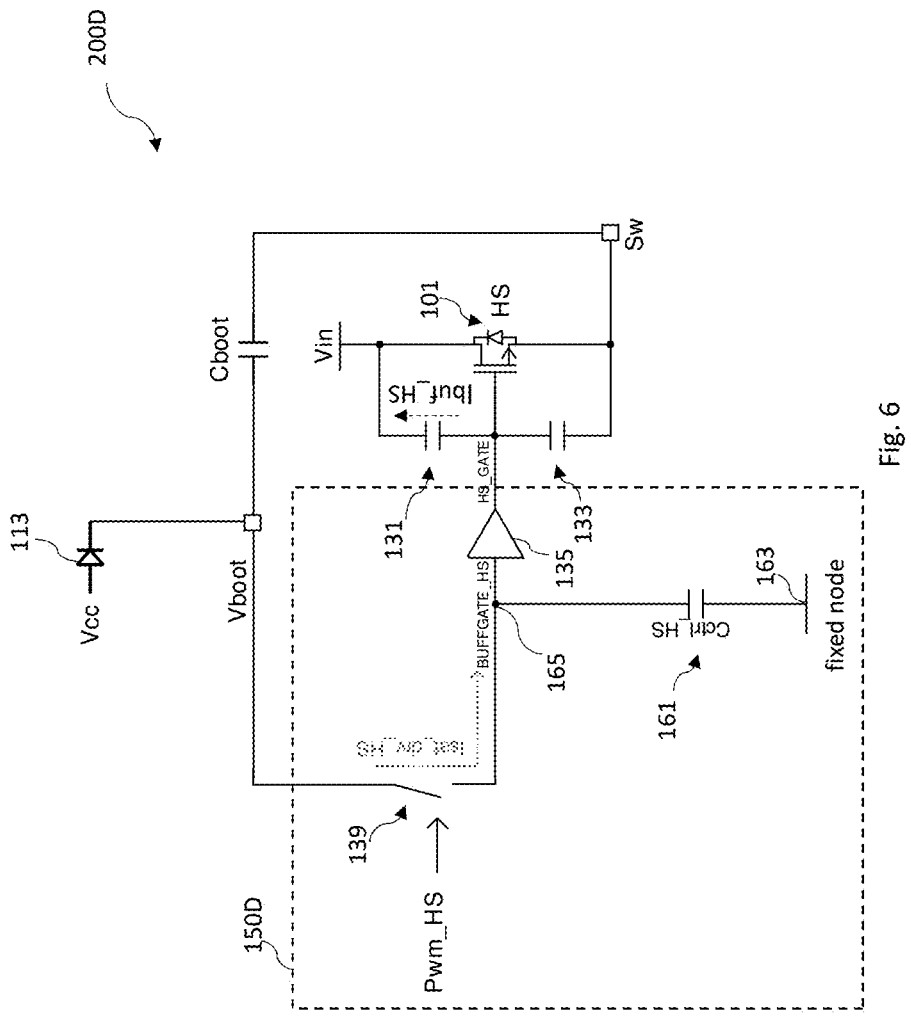
FIG. 6 illustrates a schematic diagram of an SMPS having a driver circuit capable of slew-rate control for the switching node, in yet another embodiment.

Variations to the disclosed embodiments are possible and are fully intended to be included within the scope of the present disclosure. For instance, the switch circuits 139 and 149 shown in FIG. 2 may be any suitable switch circuit besides the inverters illustrated in FIG. 2. As an example, each of the switch circuits 139 and 149 may be implemented by a transistor (e.g., a P-type transistor), with a first load path terminal (e.g., source terminal) of the transistor connected to a respective power source (e.g., the boot-strap capacitor $C_{boot}$ for the switch circuit 139, or the supply generator 115 that generates the supply voltage $V_{cc}$ for the switch circuit 149), with a second load path terminal (e.g., drain terminal) of the transistor connected to a respective control node (e.g., the node 165 for the switch circuit 139, or the node 167 for the switch circuit 149), and with the control terminal of the transistor connected to a respective control signal (e.g., the control signal Pwm_HS for the switch circuit 139, or the control signal Pwm_LS for switch circuit 149). In FIGS. 5 and 6, the switch circuit 149 and/or the switch circuit 139 are illustrated using a generic switch symbol, which may be implemented as transistors, as discussed above. Therefore, in each embodiment (e.g., 200A, 200B, 200C, and 200D) of the present disclosure, the switch circuits 139 and 149 may be implemented as inverters, as shown in FIG. 2, or may be implemented as transistors as discussed above.

As another example of variations to the disclosed embodiments, each the switch circuits 139 and 149 may be implemented as a current source (e.g., a current generator) and a switch (e.g., a transistor) coupled in series with the current source. The current source provides the respective charging current ($I_{sat\_drv\_HS}$ or $I_{sat\_drv\_LS}$), and the switch is used to enable or disable the flow of the charging current. The current source may be, e.g., a current mirror whose main current is defined by a trimming bit such that the main current can be selected from a plurality of pre-determined values. Alternatively, the current source may be an adjustable current source that can be tuned (e.g., changed) according to some settings (e.g., control bits in a control register).

As yet another example of variations to the disclosed embodiments, while the schematic views for the various embodiments disclosed herein show each slew-rate control capacitor (137, 147, 136, or 161) as a single capacitor, these are merely non-limiting examples. One or more of the slew-rate control capacitors may be implemented as a plurality of capacitors (e.g., with smaller capacitances) coupled in parallel, or a plurality of capacitors coupled in series, combinations thereof, or the like, as examples. Other variations are also possible and are fully intended to be included within the scope of the present disclosure.

Figure 3A:
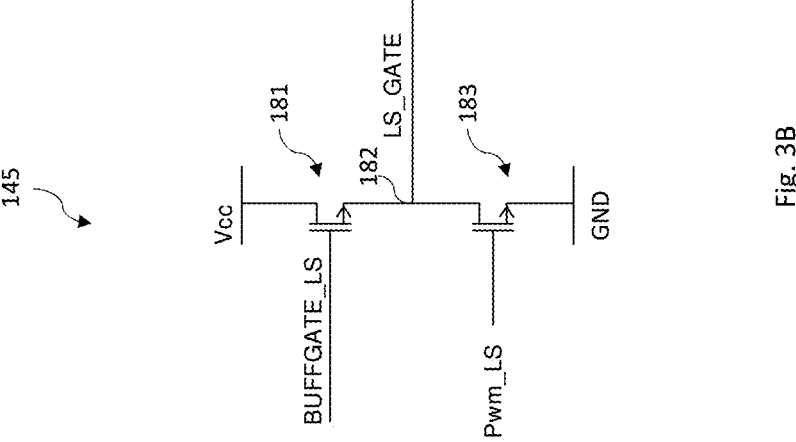
FIGS. 3A and 3B illustrate buffer circuits used in the driver circuit of the SMPS, in some embodiments.
Figure 3B:
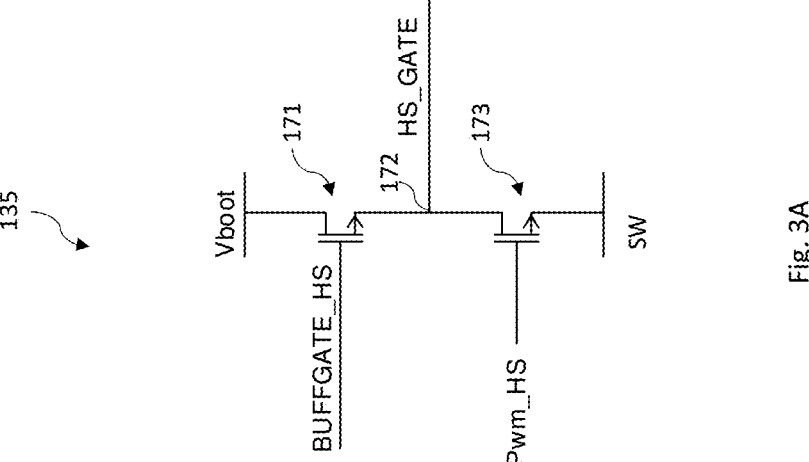

FIGS. 3A and 3B illustrate, respectively, the buffer circuits 135 and 145 that are used in the driver circuit of the Buck converter, in some embodiments. As illustrated in FIG. 3A, the buffer circuit 135 includes a transistor 171 (e.g., N-type transistor) and a transistor 173 (e.g., N-type transistor) coupled in series between the pin $V_{boot}$ and the pin SW. A control terminal of the transistor 171 is coupled to the node 165 (e.g., control node BUFFGATE_HS), and a control terminal of the transistor 173 is configured to receive the control signal Pwm_HS. A node 172 between the transistors 171 and 173 represents the output terminal of the buffer circuit 135, and is coupled to the control terminal (labeled as HS_GATE) of the switch 101. In some embodiments, the buffer circuit 135 (e.g., implemented as an N-type pull-up MOSFET) functions as a high bandwidth and high current capability buffer to provide the required amount of current to obtain the desired slew-rate for the switching node voltage.

As illustrated in FIG. 3B, the buffer circuit 145 includes a transistor 181 (e.g., N-type transistor) and a transistor 183 (e.g., N-type transistor) coupled in series between the pin $V_{cc}$ and the pin GND. A control terminal of the transistor 181 is coupled to the node 167 (e.g., control node BUFFGATE_LS), and a control terminal of the transistor 183 is configured to receive the control signal Pwm_LS. A node 182 between the transistors 181 and 183 represents the output terminal of the buffer circuit 145, and is coupled to the control terminal (labeled as LS_GATE) of the switch 103. The buffer circuit 145 functions similarly as the buffer circuit 135, thus details are not repeated.

Figure 4:
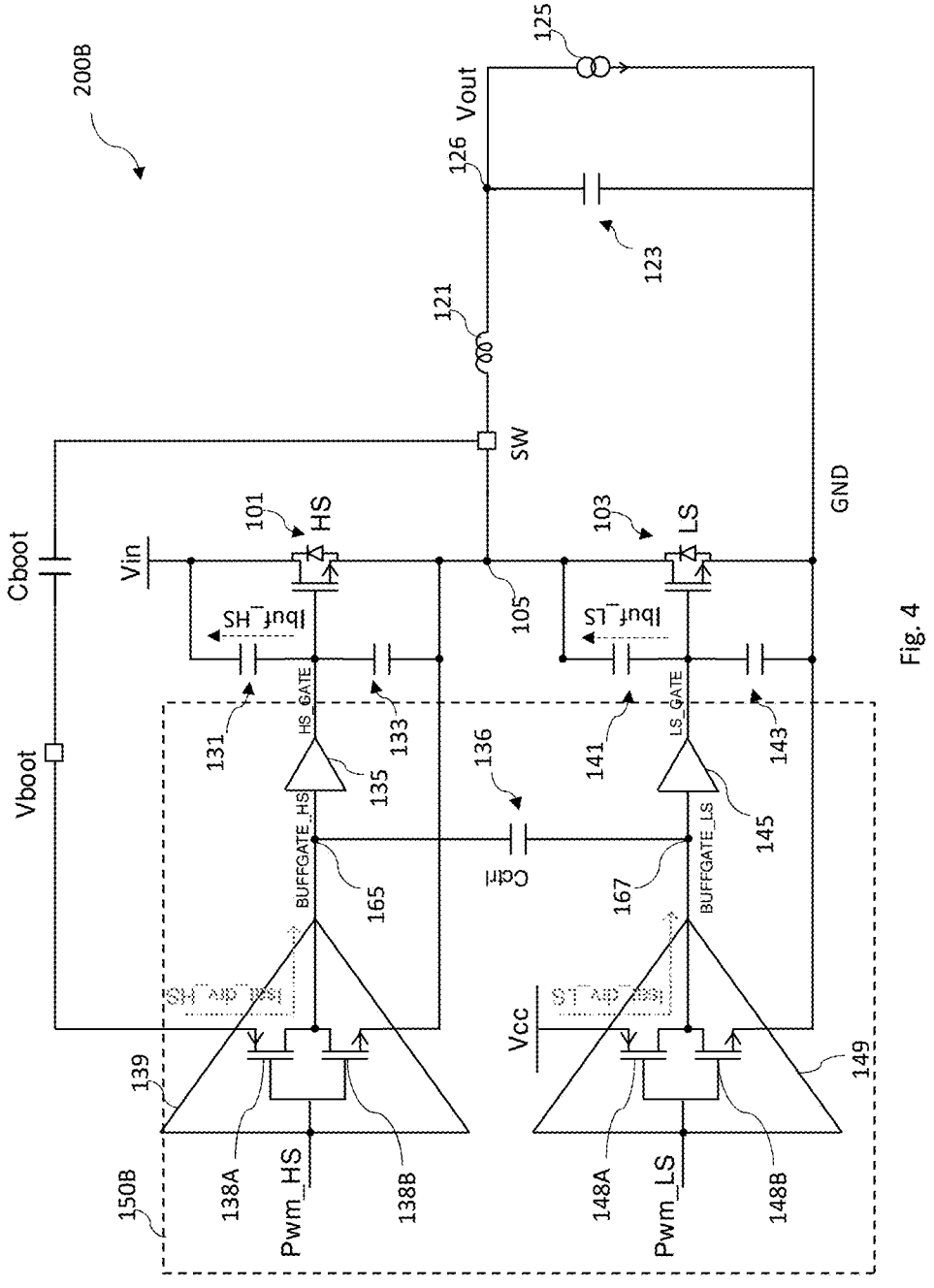
FIG. 4 illustrates a schematic diagram of an SMPS having a driver circuit capable of slew-rate control for the switching node, in another embodiment.

FIG. 4 illustrates a schematic diagram of a SMPS 200B, in an embodiment. The SMPS 200B is another example implementation of the generic SMPS 200 shown in FIG. 1. In particular, the SMPS 200B has a driver circuit 150B capable of slew-rate control for the phase node 105. Details of the driver circuit 150B are discussed hereinafter. Note that for simplicity, some components in FIG. 1, such as the control loop and logic circuit 117, the supply generator 115, the diode 113, the resistors 127/129, and the capacitor 131, are not shown in FIG. 4, with the understanding that these components are included in the SMPS 200B with the same or similar electrical connections as shown in FIG. 1.

The driver circuit 150B in FIG. 4 is similar to the driver circuit 150A in FIG. 2, but with only one slew-rate control capacitor 136 coupled between the node 165 and the node 167. In other words, the slew-rate control capacitor 136 is used to control both the slew-rates of the rising edge and the falling edge of the switching node voltage. In some embodiments, the slew-rate of the rising edge of the switching node voltage is determined by the charging current $I_{sat\_drv\_HS}$ and the capacitance $C_{ctrl}$ of the slew-rate control capacitor 136, and is given by the following equation:

$$Sw_{SRUP} = \frac{I_{sat\_drv\_HS}}{C_{ctrl}} = \frac{I_{buf\_HS}}{C_{gd\_HS}} \qquad (3)$$

The dual effect is that the slew-rate of the falling edge of the switching node voltage is determined by the charging current $I_{sat\_drv\_LS}$ and the capacitance $C_{ctrl}$ of the slew-rate control capacitor 136, and is given by the following equation:

$$Sw_{SRDOWN} = \frac{I_{sat\_drv\_LS}}{C_{ctrl}} = \frac{I_{buf\_LS}}{C_{gd\_LS}} \qquad (4)$$

Since the driver circuit 150B uses only one slew-rate control capacitor 136, the area needed in the IC device 100 for integrating the slew-rate control capacitor is reduced compared with, e.g., the driver circuit 150A.

FIG. 5 illustrates a schematic diagram of a SMPS 200C, in an embodiment. The SMPS 200C is yet another example implementation of the generic SMPS 200 shown in FIG. 1. In particular, the SMPS 200C has a driver circuit 150C capable of slew-rate control for the phase node 105. Details of the driver circuit 150C are discussed hereinafter. Note that for simplicity, some components in FIG. 1, such as the control loop and logic circuit 117, the supply generator 115, the resistors 127/129, and the capacitor 131, are not shown in FIG. 5, with the understanding that these components are included in the SMPS 200C with the same or similar electrical connections as shown in FIG. 1.

The driver circuit 150C in FIG. 5 is similar to the driver circuit 150A in FIG. 2, but with the switch circuits 139 and 149 illustrated using generic switch symbols. In addition, the slew-rate control capacitor 137 is coupled between the node 165 and a node 156 (e.g., an output terminal) of a voltage divider 158 formed by resistors 155 and 157, which voltage divider 158 is coupled between the pin $V_{in}$ and the pin GND. Furthermore, the slew-rate control capacitor 147 is coupled between the node 167 and a node 152 (e.g., an output terminal) of a voltage divider 154 formed by resistors 151 and 153, which voltage divider 154 is coupled between the pin SW and the pin GND. The resistors 151, 153, 155, and 157 may be implemented as external components of the IC device 100, in some embodiments. FIG. 5 also illustrates the diode 113 coupled between the pin $V_{cc}$ and the pin $V_{boot}$.

In the driver circuit 150A of FIG. 2, the power rating (e.g., maximum voltage tolerance) of the slew-rate control capacitors 137 and 147 needs to be high enough to tolerate the supply voltage at the pin $V_{in}$. In embodiments where the supply voltage at the pin $V_{in}$ is high, such as +100 V, the power rating of the slew-rate control capacitors 137 and 147 is high, which may require larger areas for implementation of the slew-rate control capacitors 137 and 147 in the IC device 100.

In the driver circuit 150C of FIG. 5, the output voltages of the voltage dividers 158 and 152 are lower than their respective input voltage, which reduces the maximum voltage drop across the slew-rate control capacitors 137 and 147. As a result, the power rating of the slew-rate control capacitors 137 and 147 in FIG. 5 is lower than that of the slew-rate control capacitors 137 and 147 in FIG. 2.

The maximum voltage tolerance for the slew-rate control capacitor 137 and 147 used in FIG. 5 may be analyzed to determine their power rating. Denote the dividing ratio of the voltage divider 158 as $$R1 = \frac{R157}{R155 + R157},$$

and denote the dividing ratio of the voltage divider 152 as $$R2 = \frac{R153}{R151 + R153},$$

where R151, R153, R155, and R157 denote the resistance of the resistors 151, 153, 155, and 157, respectively. In some embodiments, when the switch 101 is turned on, the control node 165 has a voltage of $V_{in}+V_{cc}$, where $V_{in}$ is the supply voltage at the pin $V_{in}$ of the IC device 100 and may be, e.g., +100 V, and $V_{cc}$ (e.g., +5 V) is the maximum gate-source voltage of the switch 101 when it is fully turned on. When the switch 103 is turned on, the control node 165 has a voltage of zero volt (e.g., at electrical ground). The node 156 has a fixed voltage of $V_{in}*R_1$. Therefore, the amplitude of the maximum voltage drop across the slew-rate control capacitor 137 is given by:

$$V1 = \max(V_{in} * R_1, V_{in} * (1 - R_1) + V_{cc}) \qquad (5)$$

Similar analysis can be done for the slew-rate control capacitor 147. In some embodiments, when the switch 103 is turned on, the voltage at the node 152 is zero, and the voltage at the node 167 is $V_{cc}$ (e.g., +5V), which is the gate-source voltage of the switch 103 when it is fully turned on. When the switch 101 is turned on, the voltage at the node 152 is $V_{in}*R_2$, and the voltage at the control node 167 is zero. Therefore, the amplitude of the maximum voltage drop across the slew-rate control capacitor 147 is given by:

$$V2 = \max(V_{in} * R_2, V_{cc}) \qquad (6)$$

The power ratings of the slew-rate control capacitors 137 and 147 in FIG. 5 should be high enough to tolerate the maximum voltage drop V1 given in Equation (5) and the maximum voltage drop V2 given in Equation (6), respectively. In some embodiments, the dividing ratios R1 and R2 in FIG. 5 are chosen to be 0.5, and assuming that the supply voltage $V_{in}$ (e.g., +100V) is much larger than $V_{cc}$ (e.g., +5V), then the maximum voltage drop V is about half of the supply voltage $V_{in}$, which means that the power rating of the slew-rate control capacitors 137 and 147 in FIG. 5 is half of that of the slew-rate control capacitors 137 and 147 in FIG. 2. The lower power rating of the slew-rate control capacitors 137 and 147 in FIG. 5 advantageously reduces the area needed for implementation of the slew-rate control capacitors 137 and 147 in the IC device 100.

FIG. 6 illustrates a schematic diagram of a SMPS 200D having a driver circuit 150D capable of slew-rate control for the switching node, in yet another embodiment. The SMPS 200D is an abstraction of the SMPS 200A, the SMPS 200B, and the SMPS 200C. The SMPS 200D in FIG. 6 focuses on portions of the driver circuit 150D used for driving the high-side switch 101, and omits the low-side switch 103 and portions of the driver circuit 150D used for driving the low-side switch 103. Notably, FIG. 6 shows a slew-rate control capacitor 161 coupled between the node 165 and a fixed node 163. As discussed hereinafter, the slew-rate control capacitor 161 in FIG. 6 corresponds to the slew-rate control capacitor 137 in FIG. 2 or 5, or corresponds to the slew-rate control capacitor 136 in FIG. 4. The fixed node 163 corresponds to the pin $V_{in}$ in FIG. 2, the node 167 in FIG. 4, or the node 156 in FIG. 5.

In the context of discussing power bridge topics, the term "fixed node" refers to a node having a voltage that is still (e.g., fixed), or moves within the driver voltage domain (e.g., between supply voltage $V_{cc}$ and GND). In addition, the term "floating node" refers to a node having a voltage that moves with the voltage at the switching node 105 and may move out of the driver voltage domain.

The node 165 is a floating node, because the voltage at the node 165 is $V_{cc}$ (e.g., +5V) when the high-side switch 101 is being turned on (e.g., during the turn-on phase); is $V_{in}+V_{gsHS}$ (e.g., 100V+5V) after the high-side switch 101 is turned on; and is about $V_{in}$ right after high-side switch 101 is turned off, then falls with the voltage at the switching node 105 (this fall may be caused passively by the inductance current or actively by the low-side switch 103 being turning on). When the low-side switch 103 is turned on, the voltage at the node 165 is zero (e.g., GND).

The node 163 is a fixed node. Recall that the node 163 corresponds to the pin $V_{in}$ in FIG. 2, the node 167 in FIG. 4, or the node 156 in FIG. 5. The pin $V_{in}$ has a fixed voltage (e.g., +100 V). The node 156 in FIG. 5 has a fixed voltage (e.g., $V_{in}*R_1$). The node 167 in FIG. 4 has a voltage that is $V_{cc}$ (e.g., +5V) when the low-side switch 103 is being turned on or after the low-side switch 103 is turned on; and is zero (e.g., electrical ground) after the low-side switch 103 is turned off. Therefore, the node 163 is a fixed node. Based on the discussion above, the slew-rate control capacitor 161 in FIG. 6 (which represents the slew-rate control capacitors 137 and 136) is said to be coupled between a floating node 165 and a fixed node 163 (which represents the pin $V_{in}$ in FIG. 2, the node 167 in FIG. 4, or the node 156 in FIG. 5).

Following the above analysis, skilled artisans will readily appreciate that switching node 105 is a floating node, and the node 152 in FIG. 5 is also a floating node. Therefore, the slew-rate control capacitor 147 in FIGS. 2 and 5 is said to be coupled between a fixed node 167 and a floating node (e.g., the switching node 105 in FIG. 2, or the node 152 in FIG. 5).

Figure 7:
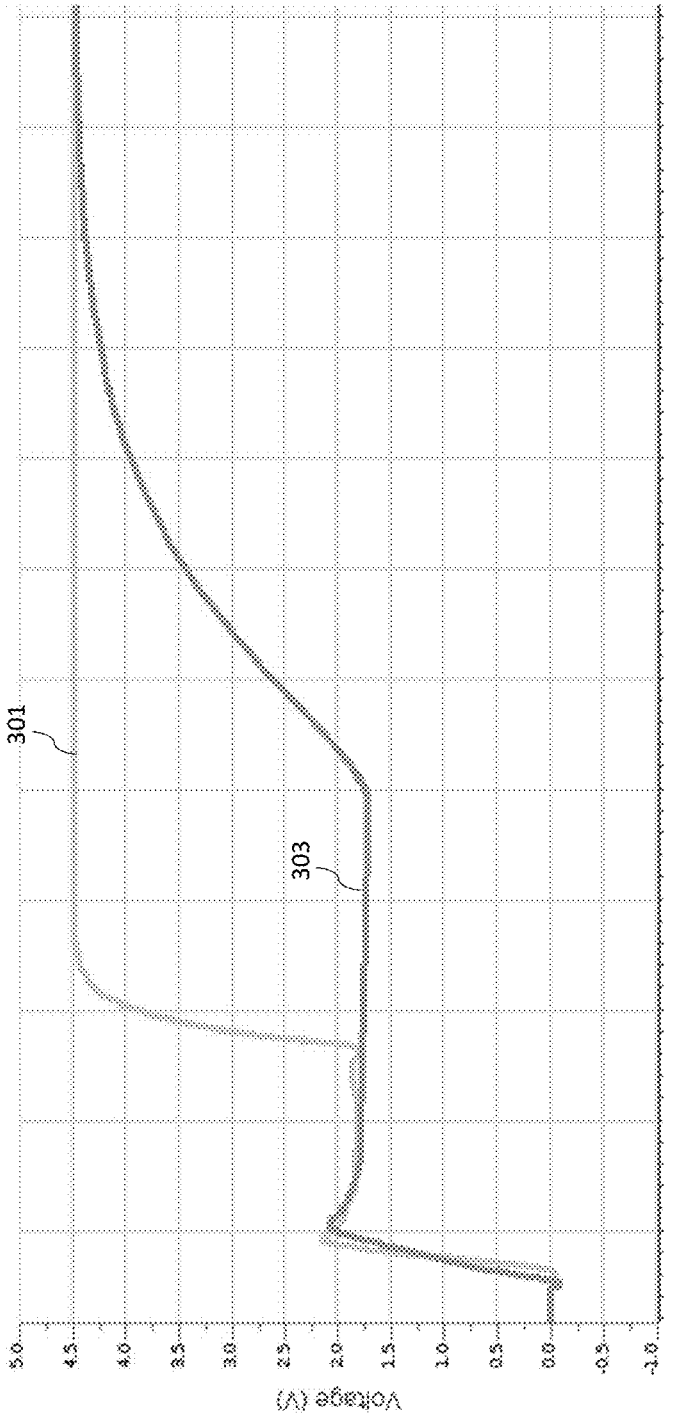
FIGS. 7 and 8 illustrate the performance of the Buck converter with slew-rate control mechanism, in an embodiment.
Figure 8:
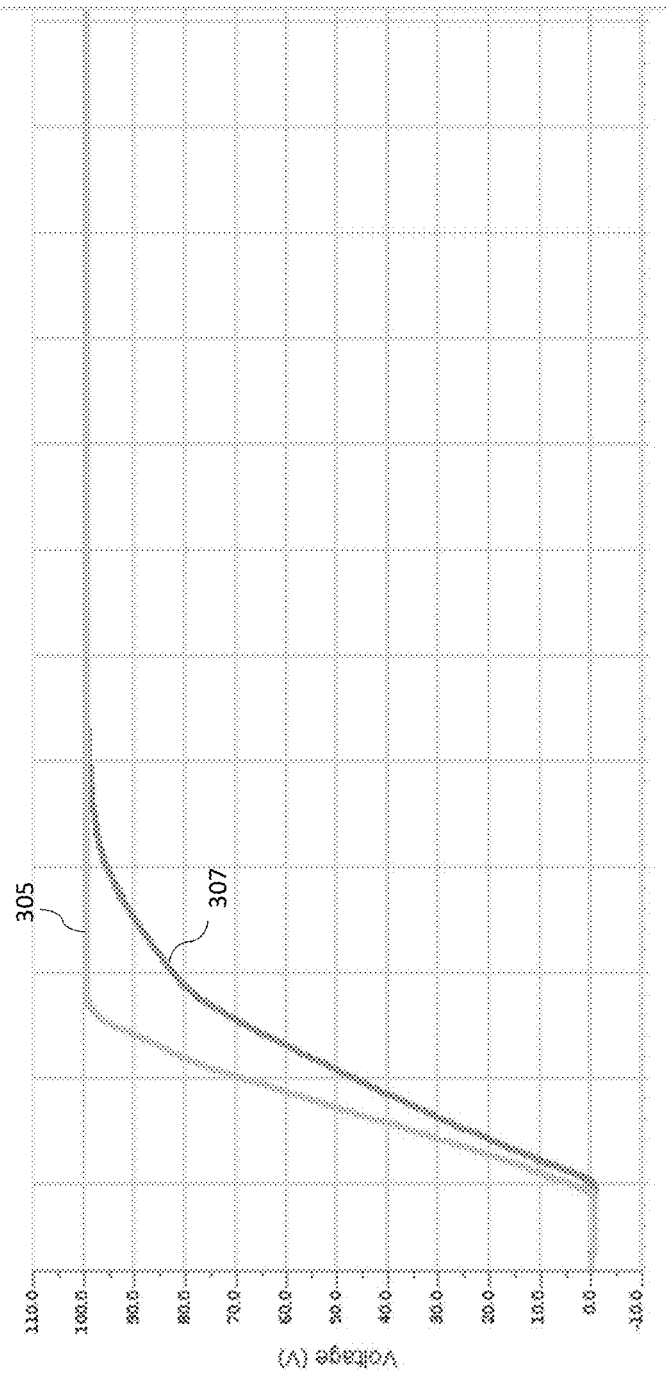

FIGS. 7 and 8 illustrate the performance of the Buck converter with slew-rate control, in an embodiment. The curve 301 in FIG. 7 shows the gate-source voltage of the high-side switch 101 when the high-side switch 101 is turned on. The Buck converter 200B shown in FIG. 4 is used to obtain the simulation results. For comparison, the curve 303 shows the simulation results of a reference Buck converter without the disclosed slew-rate control mechanism. The reference Buck converter is similar to the Buck converter 200B, but without the buffer circuits 135 and 145, and without the slew-rate control capacitor 136. As a result, the reference Buck converter needs to scale the charging currents (e.g., Isat_drv_HS and Isat_drv_LS) to charge the larger capacitances (e.g., gate-drain capacitances) of the power switches (e.g., 101 and 103). The curve 305 in FIG. 8 shows the corresponding switching node voltage of the high-side switch 101 for the disclosed Buck converter with slew-rate control. For comparison, the curve 307 in FIG. 8 shows the corresponding switching node voltage of the high-side switch of the reference Buck converter.

As can be seen in FIGS. 7 and 8, for the Buck converter with slew-rate control mechanism, the overall phase node voltage slope during risetime is extremely regular, whereas the reference Buck converter shows a strongly non-linear behavior in the risetime. The shorter, smoother risetime indicates less switching loss and better performance of the Buck converter with the disclosed slew-rate control mechanism.

Embodiments may achieve advantages as described below. For example, the disclosed driver circuit of the Buck converters, by using one or more slew-rate control capacitors, allows precise control of the slew-rate of the switching node voltage. As a result, the switching loss of the Buck converter may be reduced significantly. The slew-rate control mechanism also allows control of the EMI produced by the Buck converter to meet regulations and/or performance requirements. The use of the buffer circuits 135 and 145 reduces the area required to implement the slew-rate control capacitors in IC devices. The driver circuit 150B uses a single slew-rate control capacitor for slew-rate control, which further reduces the area needed to implement the slew-rate control capacitor. The use of voltage dividers 158 and 154 in FIG. 5 allows slew-rate control capacitor with lower power ratings to be used, which also reduces the cost and/or area needed for implementation of the slew-rate control capacitors.

Examples of the present invention are summarized here. Other examples can also be understood from the entirety of the specification and the claims filed herein.

Example 1. In accordance with an embodiment, a switched-mode power supply (SMPS) includes: a high-side switch coupled between a supply voltage node and a switching node, wherein the high-side switch is configured to be controlled by a first control signal; a low-side switch coupled between the switching node and a reference voltage node, wherein the low-side switch is configured to be controlled by a second control signal; and a driver circuit for the high-side switch and the low-side switch, which comprises: a first buffer circuit coupled between a first node and a control terminal of the high-side switch; a first switch circuit, wherein a control terminal of the first switch circuit is configured to receive the first control signal, an input terminal of the first switch circuit is coupled to a first power source, and an output terminal of the first switch circuit is coupled to the first node, wherein the first switch circuit is configured to output a first charging current provided by the first power source when the first control signal is asserted; a second buffer circuit coupled between a second node and a control terminal of the low-side switch; a second switch circuit, wherein a control terminal of the second switch circuit is configured to receive the second control signal, an input terminal of the second switch circuit is coupled to a second power source, and an output terminal of the second switch circuit is coupled to the second node, wherein the second switch circuit is configured to output a second charging current provided by the second power source when the second control signal is asserted; and a first slew-rate control capacitor, wherein a first terminal of the first slew-rate control capacitor is coupled to the first node.

Example 2. The SMPS of Example 1, further comprising: an inductor coupled between the switching node and an output terminal of the SMPS; and a capacitor coupled between the output terminal of the SMPS and the reference voltage node.

Example 3. The SMPS of Example 1, wherein the high-side switch and the low-side switch are N-type transistors, wherein the high-side switch and the low-side switch are configured to be switched ON and OFF alternately during operation of the SMPS.

Example 4. The SMPS of Example 3, wherein a second terminal of the first slew-rate control capacitor is coupled to the second node.

Example 5. The SMPS of Example 4, wherein a first ratio between a first value of the first charging current and a capacitance of the first slew-rate control capacitor is equal to a first pre-determined slew rate of a rising edge of a voltage of the switch node during switching of the SMPS, wherein a second ratio between a second value of the second charging current and the capacitance of the first slew-rate control capacitor is equal to a second pre-determined slew rate of a falling edge of the voltage of the switch node during the switching of the SMPS.

Example 6. The SMPS of Example 5, further comprising a boot-strap capacitor coupled between the switching node and the input terminal of the first switch circuit, wherein the boot-strap capacitor is the first power source, wherein the boot-strap capacitor is configured to provide the first charging current when the high-side switch is being turned ON, and is configured to be charged by a supply voltage when the voltage at the switching node is lower than the supply voltage.

Example 7. The SMPS of Example 6, further comprising a supply generator configured to generate the supply voltage, wherein the supply generator is the second power source.

Example 8. The SMPS of Example 7, wherein the first buffer circuit comprises a first transistor and a second transistor coupled in series between the input terminal of the first switch circuit and the switching node, wherein a control terminal of the first transistor is coupled to the first node, a control terminal of the second transistor is configured to receive the first control signal, and a node between the first transistor and the second transistor is coupled to the control terminal of the high-side switch.

Example 9. The SMPS of Example 8, wherein the second buffer circuit comprises a third transistor and a fourth transistor coupled in series between the input terminal of the second switch circuit and the reference voltage node, wherein a control terminal of the third transistor is coupled to the second node, a control terminal of the fourth transistor is configured to receive the second control signal, and a node between the third transistor and the fourth transistor is coupled to the control terminal of the low-side switch.

Example 10. The SMPS of Example 3, wherein a second terminal of the first slew-rate control capacitor is coupled to the supply voltage node, wherein the driver circuit further comprises a second slew-rate control capacitor coupled between the second node and the switching node.

Example 11. The SMPS of Example 10, wherein a first ratio between a first value of the first charging current and a capacitance of the first slew-rate control capacitor is equal to a first pre-determined slew rate of a rising edge of a voltage of the switch node during switching of the SMPS, wherein a second ratio between a second value of the second charging current and a capacitance of the second slew-rate control capacitor is equal to a second pre-determined slew rate of a falling edge of the voltage of the switch node during the switching of the SMPS.

Example 12. The SMPS of Example 3, further comprising: a first voltage divider coupled between the supply voltage node and the reference voltage node, wherein a second terminal of the first slew-rate control capacitor is coupled to an output terminal of the first voltage divider; a second voltage divider coupled between the switching node and the reference voltage node; and a second slew-rate control capacitor coupled between the second node and an output terminal of the second voltage divider.

Example 13. In accordance with an embodiment, a Buck converter includes: a high-side switch and a low-side switch coupled in series between a supply voltage node and a reference voltage node, wherein the high-side switch and the low-side switch are configured to be controlled by a first control signal and a second control signal, respectively; a switching node between the high-side switch and the low-side switch; a first buffer coupled between a first node and a control terminal of the high-side switch; a first switch circuit, wherein a control terminal of the first switch circuit is configured to receive the first control signal, wherein when the first control signal is asserted, the first switch circuit is configured to pass through a first charging current provided by a first power source to the first node; a second buffer coupled between a second node and a control terminal of the low-side switch; a second switch circuit, wherein a control terminal of the second switch circuit is configured to receive the second control signal, wherein when the second control signal is asserted, the second switch circuit is configured to pass through a second charging current provided by a second power source to the second node; and a first slew-rate control capacitor, wherein a first terminal of the first slew-rate control capacitor is coupled to the first node.

Example 14. The Buck converter of Example 13, further comprising: a boot-strap capacitor coupled between the switching node and the first switch circuit, wherein the boot-strap capacitor is the first power source, wherein the boot-strap capacitor is configured to be charged by a supply voltage when a voltage at the switching node is lower than the supply voltage; and a supply generator configured to generate the supply voltage, wherein the supply generator is the second power source.

Example 15. The Buck converter of Example 14, wherein a second terminal of the first slew-rate control capacitor is coupled to the second node.

Example 16. The Buck converter of Example 14, wherein a second terminal of the first slew-rate control capacitor is coupled to the supply voltage node, wherein the Buck converter further comprises a second slew-rate control capacitor coupled between the second node and the switching node.

Example 17. The Buck converter of Example 14, further comprising: a first voltage divider coupled between the supply voltage node and the reference voltage node, wherein a second terminal of the first slew-rate control capacitor is coupled to an output terminal of the first voltage divider; a second voltage divider coupled between the switching node and the reference voltage node; and a second slew-rate control capacitor coupled between the second node and an output terminal of the second voltage divider.

Example 18. In accordance with an embodiment, a Buck converter includes: a first power switch coupled between a supply voltage node and a switching node, wherein the first power switch is configure to be controlled by a first control signal; a boot-strap capacitor, wherein a first terminal of the boot-strap capacitor is coupled to the switching node; a first buffer coupled between a first node and a control terminal of the first power switch; a first switch circuit coupled between the first node and a second terminal of the boot-strap capacitor, wherein the first switch circuit is controlled by the first control signal, and is configured to pass through a first charging current provided by the boot-strap capacitor when the first control signal is asserted; and a slew-rate control capacitor, wherein a first terminal of the slew-rate control capacitor is coupled to the first node.

Example 19. The Buck converter of Example 18, further comprising: a second power switch coupled between the switching node and a reference voltage node, wherein the second power switch is configure to be controlled by a second control signal; a second buffer coupled between a second node and a control terminal of the second power switch; and a second switch circuit coupled between the second node and a power source, wherein the second switch circuit is controlled by the second control signal, and is configured to pass through a second charging current provided by the power source when the second control signal is asserted.

Example 20. The Buck converter of Example 19, wherein a second terminal of the slew-rate control capacitor is coupled to the second node.

While this invention has been described with reference to illustrative examples, this description is not intended to be construed in a limiting sense. Various modifications and combinations of the illustrative examples, as well as other examples of the invention, will be apparent to persons skilled in the art upon reference to the description. It is therefore intended that the appended claims encompass any such modifications or examples.

What is claimed is:

1. A switched-mode power supply (SMPS) comprising:
a high-side switch coupled between a supply voltage node and a switching node, wherein the high-side switch is configured to be controlled by a first control signal;
a low-side switch coupled between the switching node and a reference voltage node, wherein the low-side switch is configured to be controlled by a second control signal; and
a driver circuit for the high-side switch and the low-side switch, comprising:
a first buffer circuit coupled between a first node and a control terminal of the high-side switch;
a first switch circuit, wherein a control terminal of the first switch circuit is configured to receive the first control signal, an input terminal of the first switch circuit is coupled to a first power source, and an output terminal of the first switch circuit is coupled to the first node, wherein the first switch circuit is configured to output a first charging current provided by the first power source when the first control signal is asserted, wherein the first buffer circuit comprises a first transistor and a second transistor coupled in series between the input terminal of the first switch circuit and the switching node, wherein a control terminal of the first transistor is coupled to the first node, a control terminal of the second transistor is configured to receive the first control signal, and a node between the first transistor and the second transistor is coupled to the control terminal of the high-side switch;
a second buffer circuit coupled between a second node and a control terminal of the low-side switch;
a second switch circuit, wherein a control terminal of the second switch circuit is configured to receive the second control signal, an input terminal of the second switch circuit is coupled to a second power source, and an output terminal of the second switch circuit is coupled to the second node, wherein the second switch circuit is configured to output a second charging current provided by the second power source when the second control signal is asserted; and
a first slew-rate control capacitor, wherein a first terminal of the first slew-rate control capacitor is coupled to the first node.

2. The SMPS of claim 1, further comprising:
an inductor coupled between the switching node and an output terminal of the SMPS; and
a capacitor coupled between the output terminal of the SMPS and the reference voltage node.

3. The SMPS of claim 1, wherein the high-side switch and the low-side switch are N-type transistors, wherein the high-side switch and the low-side switch are configured to be switched ON and OFF alternately during operation of the SMPS.

4. The SMPS of claim 3, wherein a second terminal of the first slew-rate control capacitor is coupled to the second node.

5. The SMPS of claim 4, wherein a first ratio between a first value of the first charging current and a capacitance of the first slew-rate control capacitor is equal to a first pre-determined slew rate of a rising edge of a voltage of the switching node during switching of the SMPS, wherein a second ratio between a second value of the second charging current and the capacitance of the first slew-rate control capacitor is equal to a second pre-determined slew rate of a falling edge of the voltage of the switching node during the switching of the SMPS.

6. The SMPS of claim 3, wherein a second terminal of the first slew-rate control capacitor is coupled to the supply voltage node, wherein the driver circuit further comprises a second slew-rate control capacitor coupled between the second node and the switching node.

7. The SMPS of claim 6, wherein a first ratio between a first value of the first charging current and a capacitance of the first slew-rate control capacitor is equal to a first pre-determined slew rate of a rising edge of a voltage of the switching node during switching of the SMPS, wherein a second ratio between a second value of the second charging current and a capacitance of the second slew-rate control capacitor is equal to a second pre-determined slew rate of a falling edge of the voltage of the switching node during switching of the SMPS.

8. The SMPS of claim 3, further comprising:
a first voltage divider coupled between the supply voltage node and the reference voltage node, wherein a second terminal of the first slew-rate control capacitor is coupled to an output terminal of the first voltage divider;
a second voltage divider coupled between the switching node and the reference voltage node; and
a second slew-rate control capacitor coupled between the second node and an output terminal of the second voltage divider.

9. The SMPS of claim 1, further comprising a boot-strap capacitor coupled between the switching node and the input terminal of the first switch circuit, wherein the boot-strap capacitor is the first power source, wherein the boot-strap capacitor is configured to provide the first charging current when the high-side switch is being turned ON, and is configured to be charged by a supply voltage when a voltage at the switching node is lower than the supply voltage.

10. The SMPS of claim 9, further comprising a supply generator configured to generate the supply voltage, wherein the supply generator is the second power source.

11. The SMPS of claim 1, wherein the second buffer circuit comprises a third transistor and a fourth transistor coupled in series between the input terminal of the second switch circuit and the reference voltage node, wherein a control terminal of the third transistor is coupled to the second node, a control terminal of the fourth transistor is configured to receive the second control signal, and a node between the third transistor and the fourth transistor is coupled to the control terminal of the low-side switch.

12. A Buck converter comprising:

a high-side switch and a low-side switch coupled in series between a supply voltage node and a reference voltage node, wherein the high-side switch and the low-side switch are configured to be controlled by a first control signal and a second control signal, respectively;

a switching node between the high-side switch and the low-side switch;

a first buffer coupled between a first node and a control terminal of the high-side switch;

a first switch circuit, wherein a control terminal of the first switch circuit is configured to receive the first control signal, wherein when the first control signal is asserted, the first switch circuit is configured to pass through a first charging current provided by a first power source to the first node;

a second buffer coupled between a second node and a control terminal of the low-side switch;

a second switch circuit, wherein a control terminal of the second switch circuit is configured to receive the second control signal, wherein when the second control signal is asserted, the second switch circuit is configured to pass through a second charging current provided by a second power source to the second node;

a first slew-rate control capacitor, wherein a first terminal of the first slew-rate control capacitor is coupled to the first node, and a second terminal of the first slew-rate control capacitor is coupled to the supply voltage node; and a second slew-rate control capacitor coupled between the second node and the switching node.

13. The Buck converter of claim 12, further comprising:

a boot-strap capacitor coupled between the switching node and the first switch circuit, wherein the boot-strap capacitor is the first power source, wherein the boot-strap capacitor is configured to be charged by a supply voltage when a voltage at the switching node is lower than the supply voltage; and a supply generator configured to generate the supply voltage, wherein the supply generator is the second power source.

14. A Buck converter comprising:

a first power switch coupled between a supply voltage node and a switching node, wherein the first power switch is configured to be controlled by a first control signal;

a second power switch coupled between the switching node and a reference voltage node, wherein the second power switch is configured to be controlled by a second control signal;

a boot-strap capacitor, wherein a first terminal of the boot-strap capacitor is coupled to the switching node;

a first buffer coupled between a first node and a control terminal of the first power switch;

a second buffer coupled between a second node and a control terminal of the second power switch;

a first switch circuit coupled between the first node and a second terminal of the boot-strap capacitor, wherein the first switch circuit is controlled by the first control signal, and is configured to pass through a first charging current provided by the boot-strap capacitor when the first control signal is asserted;

a first slew-rate control capacitor, wherein a first terminal of the first slew-rate control capacitor is coupled to the first node, and a second terminal of the first slew-rate control capacitor is coupled to the supply voltage node; and a second slew-rate control capacitor coupled between the second node and the switching node.

15. The Buck converter of claim 14, further comprising:

a second switch circuit coupled between the second node and a power source, wherein the second switch circuit is controlled by the second control signal, and is configured to pass through a second charging current provided by the power source when the second control signal is asserted.

16. The Buck converter of claim 15, wherein the first buffer comprises a first transistor and a second transistor coupled in series between the second terminal of the boot-strap capacitor and the switching node, wherein a control terminal of the first transistor is coupled to the first node, a control terminal of the second transistor is configured to receive the first control signal, and a node between the first transistor and the second transistor is coupled to the control terminal of the first power switch.

17. The Buck converter of claim 16, wherein the second buffer comprises a third transistor and a fourth transistor coupled in series between the power source and the reference voltage node, wherein a control terminal of the third transistor is coupled to the second node, a control terminal of the fourth transistor is configured to receive the second control signal, and a node between the third transistor and the fourth transistor is coupled to the control terminal of the second power switch.

* * * * *